Figure 1:
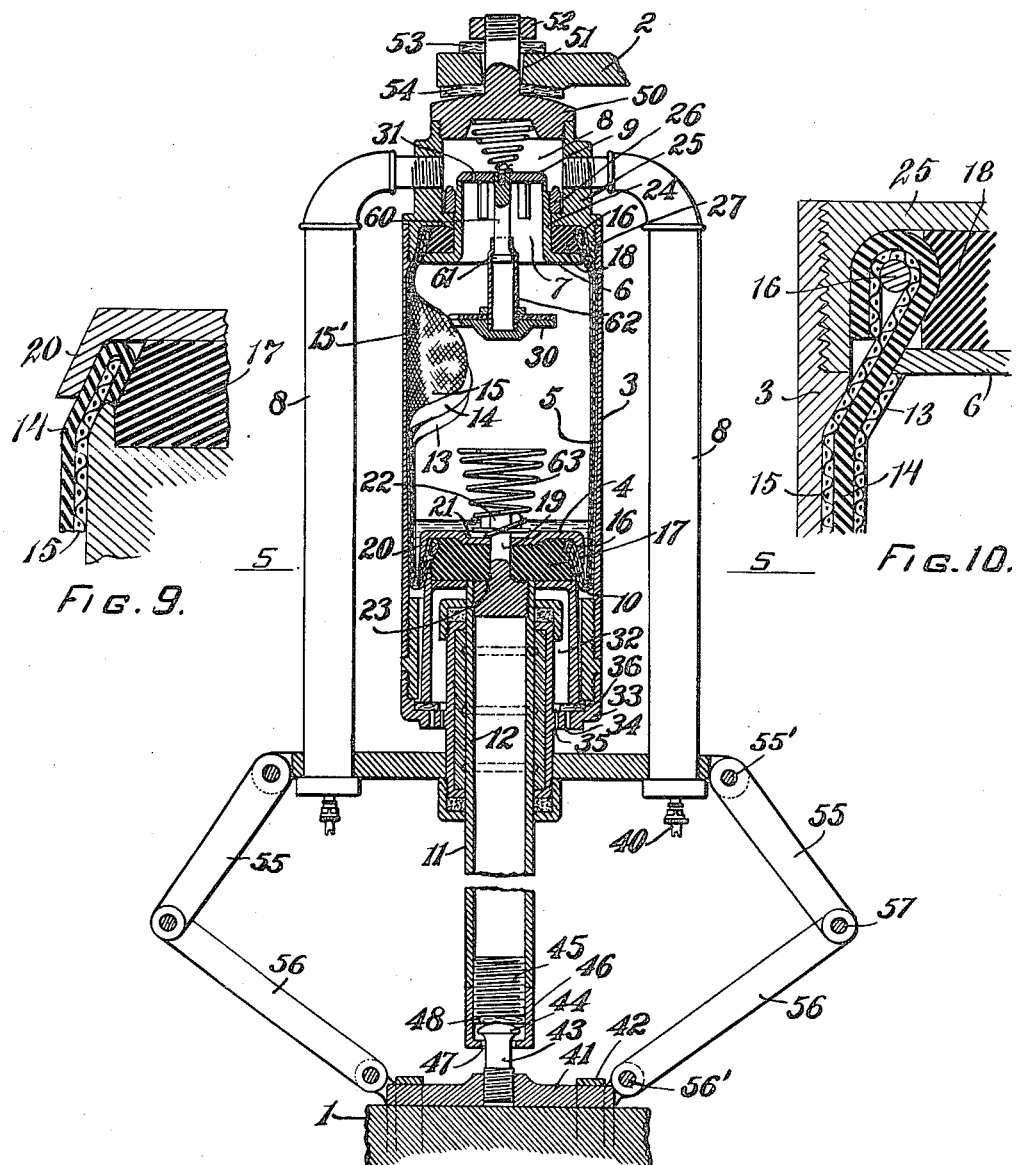

H. E. OXNARD.
EXPANSIBLE CHAMBER.
APPLICATION FILED DEC. 4, 1914.

1,205,106.

Patented Nov. 14, 1916.
2 SHEETS—SHEET 1.

WITNESSES

INVENTOR
HENRY E. OXNARD
BY
Mitchell, Chadwick & Kent
ATT'YS.

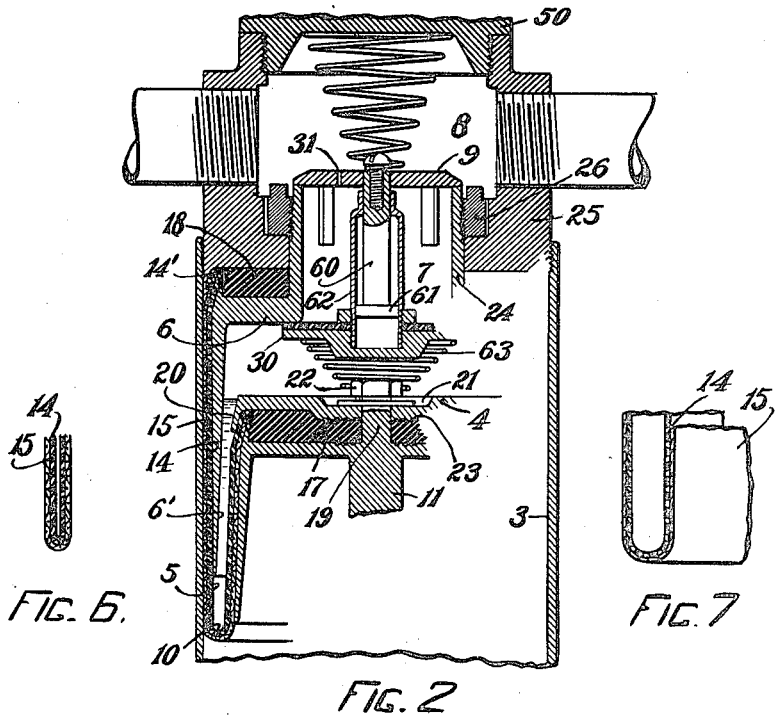

UNITED STATES PATENT OFFICE.

HENRY E. OXNARD, OF NEW BEDFORD, MASSACHUSETTS.

EXPANSIBLE CHAMBER.

1,205,106.  Specification of Letters Patent.  Patented Nov. 14, 1916.

Original application filed May 18, 1910, Serial No. 562,012. Divided and this application filed December 4, 1914. Serial No. 875,547.

*To all whom it may concern:*

Be it known that I, HENRY E. OXNARD, a citizen of the United States, formerly of Newton, but now residing at New Bedford, in the county of Bristol and State of Massachusetts, have invented new and useful Improvements in Expansible Chambers, of which the following is a specification.

This invention relates to improvements in expansible chambers.

The object is to make a chamber which can hold a fluid under high pressure, without leakage, and with extensive and almost frictionless variations of volume.

To this end the invention comprises improvements in flexible and fragile walls, in the direction of preventing leakage of the high pressure fluid, either through them or around them, and other features incidental to this.

This application is a division of my application Serial No. 562,012, filed May 18, 1910, for patent of the United States, the patent being dated December 8, 1914, No. 1,119,984.

The invention is herein shown as it may be embodied in a pneumatic spring for a vehicle; but it is applicable to a wide variety of other uses. When embodied in a spring, the invention approximates a result which has been much desired but never before attained, namely, a spring having a wide range of action, the strength of steel, and the perfect resilience of air.

The walls of the chamber include a strong round casing and a plunger within it, these two being joined by a highly flexible septum. The septum is everted or doubled upon itself in a sharp bend or fold. One part of it incases the convex body of the plunger like a sleeve, and the other part fits loosely the surrounding concave surface of the casing. Fluid in the chamber separates the doubled parts of the septum. Except at the fold, the full pressure of the contained fluid upon the septum is sustained by the walls of the plunger or of the casing, which may be of steel or other metal as strong as desired.

In apparatus embodying the invention the width of the fold where the septum is unsupported by metal may be very small, and under some circumstances may be almost infinitesimal, in which cases the septum must be very highly flexible; and it is a purpose of the invention to provide means by which the resulting sharp fold between the portions of the septum is mobile, with the movements of the plunger, without tendency to cause a crack or breach; and in which the rubber or other thin impervious material employed is provided with an expansible non-elastic support composed of fibrous elements so related to each other that the rubber cannot bulge or break through between the fibers. These objects being suitably accomplished, it follows that within reasonable limits, the strength of the device may be practically independent of the fragility of the material composing the septum, and may be limited only by the tensile strength of the steel cylinder.

The septum as a whole has to prevent leakage everywhere between the wall of the cylinder and the wall of the plunger, so that a part of the invention is concerned with the tightness of the joint and connections at the end of the septum, where the soft and flexible material should be detachable at will and easily replaceable in tight and firm condition, which is accomplished by providing a sort of circular jaw adapted to make air tight contact with and to compress in the radial direction the rubber of the end portion of the septum, this compression being a resultant of pressure applied by mechanical means in the axial direction.

The foregoing and other features of the invention will appear more in detail in the drawings and elsewhere in this specification.

In the accompanying drawings: Figure 1 is an elevation, in section, showing the chamber expanded; Fig. 2 is an elevation, showing a fragment in section, enlarged, showing the chamber contracted and embodying some features of different construction; Fig. 3 is a detail of part of the septum, greatly enlarged; Fig. 4 shows the same extended by a pull in the direction of the arrows; Fig. 5 is a fragmentary plan showing the septum in section on the line 5—5 of Fig. 1, enlarged; Fig. 6 is a fragmentary elevation of the same in section on the line 6—6 of Fig. 5; and Fig. 7 is a fragmentary elevation of the same in section on the line 7—7 of Fig. 5. Fig. 8 is an enlargement of a detail of Fig. 2. Fig. 9 is an enlargement of another detail of Fig. 2 and Fig. 10 is an enlargement of a detail of Fig. 1.

In Fig. 1 is seen a vehicle axle 1 and a bracket 2 on the vehicle body. Apparatus comprising the spring consists of a strong approximately cylindrical casing 3 forming a chamber which is closed at one end by a plunger 4 and a highly flexible septum 5. A passage 7 leads through the other end 6, to an extension 8 which gives the chamber any desired additional capacity. A valve 9 separates these two sections of the chamber under certain circumstances, as hereinafter described.

The septum is fastened imperviously at each end; is everted or folded cylindrically upon itself at 10 and lies loosely upon the adjacent walls of casing and plunger. The inside diameter of the casing is only a little greater than the diameter of the plunger with the double thicknesses of septum added. The expansive pressure of the fluid within the chamber forces fluid into this little space and separates the portions of the septum, forcing one smoothly against the concave inside of the casing and the other smoothly against the convex outside of the plunger. The distance between these two portions of the folded septum is very short, particularly at the fold. In order to keep the plunger portion of the septum from rubbing against the casing portion, a bearing 12 is provided, suitably lubricated, which holds the plunger stem 11 centrally within the casing 3. When in use the plunger is almost constantly in movement, inward or outward. In Fig. 1 it is shown approximately at its outward limit, and in Fig. 2 approximately at its inward limit. Consequently the fold 10 occurs at various places in the septum. The circumference and area of the septum at any particular place therefore vary in dimension, according to whether that place be at the moment lying on the plunger wall or on the casing wall or between them in the fold.

The septum may be made of three layers 13, 14, 15 of materials closely united into one whole. The middle layer 14 is of rubber, the outer layer 15, which lies against the plunger or the casing, is of stout textile fabric arranged helically; that is, with its threads running obliquely around the cylinder as indicated in Fig. 1, at 15′. The inner layer 13, is of thinner textile fabric, arranged helically. Flexible leather may be used in place of the outer and inner fabrics if desired. All the layers are fastened together adhesively, so that they work as one integral piece. By virtue of its rubber component, the septum is impervious to the fluid. By virtue of its outer component, excessive distention of rubber at the fold is prevented. The inner layer 13 is of value in strengthening the septum and in protecting the rubber from abrasion or injury. It may be omitted under some circumstances, and is omitted in the arrangement portrayed in Fig. 2. By virtue of its said arrangement, the fabric is capable of expansion or contraction to fit smoothly casing or plunger. Fig. 3 indicates one form of said arrangement in which threads are woven or interlaced together forming a fabric, and are so arranged that when the septum stands vertically as represented in Fig. 2, the threads run obliquely, as represented in Figs. 1, 3 and 4. The normal condition of such a fabric is shown in Fig. 3, where the threads are arranged close together making a firm fabric. The interlacing of the threads prevents any two adjacent threads from being separated enough to allow high pressure of fluid to force a bit of the rubber between them. At the same time the fabric is expansible. For example, by pulling in the direction shown by the arrows in Fig. 4, the fabric may be drawn into the shape shown in that figure, in which one dimension of the fragment seen in Fig. 3 has been considerably elongated. Thus the fabric may fit or lie smoothly on either the surface of the plunger or the larger surface of the casing; being expansible and at the same time not elastic; and having a limit to its expansibility at which it resists firmly any further expansion. This limit is represented in Fig. 4. Although the threads are supposed to be close together in Fig. 3, they are closer together in Fig. 4, where each thread is subject to a higher degree of compression laterally; while by reason of the change of angle there is an extension of the fabric in one direction. The fact that the extension is accompanied by a contraction in the other direction is no detriment. As the expansion occurs at the fold, where at the same instant the threads are crowded more tightly together, it will be seen that the fabric automatically strengthens itself, as it were, to hold the rubber at the place where the danger arises. The greater the bursting force exerted by the chamber contents, the greater is the tendency of the septum to bulge or be elongated at its fold, and coincidently with this is the greater crowding together of the threads, providing increased resistance to penetration of the supporting fabric by the rubber.

Another advantage incidental to helical arrangement of the fabric having interlaced threads is illustrated in Figs. 5, 6 and 7. By making the space between casing and plunger very narrow where the fold lies, so that the two limbs of the septum on opposite sides of the fold are close together, a very sharp fold may be formed, in which case the total bursting stress becomes much reduced. In such case, however, it may be supposed that the septum would suffer severely from the wear incidental to being repeatedly folded at such a sharp angle. By means of the helical arrangement of threads such evil effects are obviated. What may be termed the "net angle" between the two limbs of the septum may be very sharp as illustrated in Figs. 1, 5 and 6, and yet the actual angle between the two limbs of an individual thread is a gentle curve as illustrated in Figs. 5 and 7, where the dotted lines in Fig. 5 and full lines in Fig. 7 show the course of a thread in passing the fold. It is believed that an effect to some extent similar might be obtained by the use of a knit-ribbed fabric in place of that here illustrated.

An impervious joint and fastening of the septum to the plunger and to the cylinder is shown in Fig. 1, in which each end of the septum is bent around a metal ring 16. The inner fabric 13 stops short. The rubber layer 14 thus exposed is in contact with a mass of soft rubber 17 on the plunger head or a similar mass 18 on the cylinder head. The annular mass of rubber 17 is mounted on a stud 19 which projects axially from the plunger head. The rubber is covered by a metal cap 4 which is loose on the same stud. This cap has flanges 20 adapted to inclose circumferentially the end of the septum, and has a central portion 21 which bulges toward the rubber mass. When the nut 22 is screwed on stud 19, it forces the bulging central portion of the cap into the rubber mass 17. The excessive compression of the central part of the rubber, due to this pressure in an axial direction, seeks relief by expansion radially. Thus the edge of the rubber mass 17 is tightly pressed against the side of rubber layer 14, so that leakage between them is impossible. Escape of air between the mass 17 and the stud 19 is prevented by a corrugated surface 23 on the body of the plunger. The pressure of nut 22 forces the corrugations into the rubber and makes a series of tight closures through which no fluid can pass. Thus the plunger end of the septum is sealed.

At the other end of the chamber the fastening is similar. The disk 6 has a screw threaded stem 24 passing loosely through the screw plug 25 which constitutes the cylinder head. By a nut 26 it may be drawn tight, thus compressing the rubber mass 18 in an axial direction and expanding it in a radial direction against the septum rubber 14 which lies within the side walls 27 of the cup or depression in the inner face of the plug, in which the rubber mass lies.

The rings 16 may be omitted if desired. In Fig. 2 a somewhat different arrangement is illustrated. The layer 13 is omitted. An auxiliary rubber strip or connector 14' folded over the ends of the septum is employed, forming a rubber-to-rubber connection from the rubber of the septum to the rubber bed at the chamber end.

In all of these arrangements rubber cement may be inserted between the contiguous rubber surfaces, thus assisting the impermeability of the joint; and the rubber surfaces are nevertheless easily separable for removing the septum, when the mechanical obstructions are removed.

For the better protection of the two portions from abrasion against each other, a metal shield 6' may be used, which is a continuation of the head disk 6, as shown in Fig. 2.

When the end walls 4 and 6 of the main chamber approach each other air passes freely out through the passage 7 until a valve 30, raised by the plunger head, closes the passage 7 as shown in Fig. 2, after which, such further movement of the plunger as occurs is absorbed by compression of the air in the restricted space between the valve 30 and the plunger. The elasticity of this small body of air starts the plunger outward and is aided by the gradual return of air through the small by-passage 31, causing a gradual and gentle return of the plunger to its normal position. In order to reduce the volume of air inclosed by closure of the valve 30 an incompressible fluid such as water, mercury or a mixture of alcohol and water may be introduced to fill a part or all of the annular space between the limbs of the septum when the chamber is contracted, as seen in Fig. 2, thus preventing the plunger from striking the head of the chamber by causing the resistance of the air to increase more rapidly. The valve 9 is a check valve, depending from which is a pin 60 having a head 61 engaged in and moving easily longitudinally in a tube 62 fast to a lid valve 30. When the chamber is expanded, the valve 30 hangs from the head of this pin, as shown in Fig. 1. When the chamber has contracted to a certain degree the spring 63 on the plunger head engages the underside of valve 30, and begins to push the valve toward its seated position, covering the passage 7, which is represented in Fig. 2. When the valve is seated escape of air from chamber 3 is cut off by the positive compression of the lid on its seat. Further compression of the air confined therein ensues, the spring 63 yielding further until the advance of the plunger ceases. With the ensuing expansion, the valve 30 opens; but air returns no faster than permitted by the by-passage 31. The boss on the underside of the valve 30 may serve to center the spring 63 if necessary in making contact with the valve. The parts may be so designed that under the influence of light or ordinary shocks, the valve 30 will not close, because the chamber is not sufficiently compressed, but on extreme shocks the spring 63 will reach and close this valve, and in either case the ensuing expulsion will be slowed by the action of the valve 9.

An auxiliary device to assist toward the same result is seen at the other end of the apparatus, where an auxiliary chamber 32 on the outer side of the plunger is provided. This chamber lies between the plunger and a plate 33 which closes the end of the casing. When the plunger is forced into the casing, air is drawn through passages 34 and 35 into the auxiliary chamber 32, lifting the annular pad or washer 36. When the plunger moves outward the escape of this air is retarded by the pad 36 which closes passages 34, allowing air to escape only through the small passages 35.

For initial introduction of air to the main chamber and extension a check valve is provided at 40, which may be of any ordinary or suitable type such as is now customary for pneumatic tires or otherwise.

The connection of the apparatus to the body and the axle of a vehicle may be of any suitable sort. In the drawings the axle is represented as having a plate 41 held upon it by straps 42. A stout pin 43 having a rounded head 44 projects from this plate. By means of a plug coupling 45, a cup 46 is fastened upon the end of the plunger stem. The bottom of this cup has a hole 47 large enough for all of the pin 43 to pass through except its head 44, which is thus held in a socket. A leather buffer pad 48 intervenes between the rounded head 44 and the end of the plug 45. Normally, the weight of the vehicle passes downward through the casing, the fluid within it, the plunger, the plunger stem 11, the plug 45, and the pad 48, to the head 44 and thence to the axle. When one end of the axle is lifted by encountering an obstacle, or when the vehicle body rocks, the parts 44 and 48 roll upon each other a little.

For connecting the casing 3 to the vehicle body a stem 50 is screwed into the stock 25 of the cylinder head. This stem passes loosely through a hole 51 in a bracket 2 on the vehicle body. It is held on this bracket by a nut 52. Leather buffer pads 53, 54 intervene. The part 50 has a rounded surface on which the pad and bracket 2 rest. When one side of the vehicle body is raised or depressed, these rounded surfaces roll slightly upon each other. The diameter of hole 51 becomes gradually larger as it rises through the bracket to permit this. The bottom of the hole is about the size of the stem 50, thus preventing lateral movement thereof.

Too great a rolling sidewise of the vehicle body with respect to the axle is prevented by the links 55, 56. These are pivoted at 55' to a part extending rigidly from the plunger stem; at 56' to the axle plate; and at 57 to each other. The pivots which are seen in cross section, may be as long as desired. The longer their bearings on said links the more firmly do they resist torsion or side swaying of the vehicle body with respect to the axle; while a slight looseness of these bearings, or a slight elasticity in the links, would permit enough ease of motion to eliminate unpleasant rigidity. It will be obvious that as many of these sets of links may be used as are suitable for the need. In particular, the links represented in Fig. 1 would prevent undue swaying of the spring and vehicle body toward or from the eye; that being the direction of the axes of the pivot pins 55', 56' and 57; and to prevent such swinging toward the right or left of the figure another set of links with pivot pins running in that direction might be provided.

I claim:—

1. A highly flexible septum for an expansible chamber comprising a layer of expansible, flexible material impervious to fluid, and a layer of expansible flexible material comprising a multiplicity of interlaced threads; the two layers being closely united in the form of a tube, adapted to be everted endwise in an expansible chamber between a round casing and a plunger.

2. A highly flexible everted sleeve septum for an expansible chamber comprising a layer of expansible flexible material, impervious to fluid; and a layer of expansible flexible supporting material closely united thereto and comprising a multiplicity of threads running obliquely with respect to the axis of the sleeve and interlaced together, whereby the extent of separation of individual threads and the expansion of the fabric as a whole are limited and the sharpness of bend of threads at the fold when everted is modified; the whole being in the form of a tube adapted to be everted endwise and adapted to fit simultaneously both a round casing and a plunger within it and enough smaller than it to have more space than the double thickness of septum between the plunger and casing.

3. A highly flexible sleeve septum for an expansible chamber comprising a layer of expansible flexible material, impervious to fluid; and a layer of expansible flexible supporting material closely united thereto and comprising a multiplicity of threads running helically around the sleeve in opposite directions, those going in the same direction being in contact side by side and interlaced with those in the opposite direction, the whole being of open ended tubular form, adapted to be everted endwise and to make impervious contact at the open end with the chamber wall.

4. An everted sleeve septum combined with a round casing and a plunger, joining said casing and plunger and supported at each end by one of them; a ring about which an end of the septum is everted, and means clamping to its said support the septum thus brought together on both sides of the ring.

5. An everted sleeve septum composed of a layer of rubber and one of supporting material, the end of the rubber being everted around the end of the supporting layer, a round casing and a plunger, joined by said septum and therewith constituting an expansible chamber, and means to clamp the said triple layer at the end of the septum between two parts on the chamber wall.

6. An everted sleeve septum combined with a round casing and a plunger and therewith constituting an expansible chamber, the septum being composed of a layer of rubber and one of supporting material; a circular jaw beside the septum end; a mass of rubber on the chamber wall, forming another circular jaw beside the septum end; and means to compress the mass in the axial direction, thereby expanding it in the radial direction and clamping the septum between itself and the first mentioned circular jaw.

Signed by me at Marion, Mass., this second day of December, 1914.

HENRY E. OXNARD.

Witnesses:
ALEXANDER T. BOURNE,
WILLIAM A. ANDREW.